(12) United States Patent
Rebstock et al.

(10) Patent No.: US 6,328,834 B1
(45) Date of Patent: Dec. 11, 2001

(54) PROCESS FOR PRODUCING BODIES MADE OF FIBER-REINFORCED COMPOSITES

(75) Inventors: Kolja Rebstock, Ulm; Karl-Heinz Roess, Ebersbach, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/365,817

(22) Filed: Aug. 2, 1999

(30) Foreign Application Priority Data

Jul. 31, 1998 (DE) ................................. 198 34 571

(51) Int. Cl.$^7$ ................................. C04B 35/973
(52) U.S. Cl. ................................. 156/89.26; 156/89.27; 264/610
(58) Field of Search ............... 156/89.26, 89.27; 264/29.1, 610, 317; 428/408, 698; 188/251; 501/88

(56) References Cited

U.S. PATENT DOCUMENTS

| 5,730,915 | 3/1998 | Cornie | 164/29.1 |
| 5,772,748 | * 6/1998 | Hubbard | 106/38.27 |
| 6,086,814 | * 7/2000 | Krenkel et al. | 264/610 |

FOREIGN PATENT DOCUMENTS

| 30 37 312 A1 | 4/1981 | (DE) . |
| 44 38 455 C1 | 5/1996 | (DE) . |
| 0 277 085 A1 | 8/1988 | (EP) . |
| 0 383 715 | 8/1990 | (EP) . |
| 2236203 | 9/1990 | (JP) . |
| 8020807 | 1/1996 | (JP) . |
| WO 97/22815 | 6/1997 | (WO) . |
| WO 98/42635 | 10/1998 | (WO) . |

* cited by examiner

Primary Examiner—Michael W. Ball
Assistant Examiner—Todd J. Kilkenny
(74) Attorney, Agent, or Firm—Crowell & Moring LLP

(57) ABSTRACT

A process for producing bodies made of fiber-reinforced composites from fiber-reinforced precursor bodies having a porous carbon matrix, in particular from C/C bodies, includes (1) mixing fibers, fiber bundles or fiber agglomerates based on carbon, nitrogen, boron and/or silicon with at least one carbonizable binder to give a pressing composition, and (2) pressing the pressing composition to form a green body. At least one metal- or silicon-containing core is added to the green body. The green body is subsequently pyrolysed to convert the binder or binders into a porous carbon matrix, and the resulting fiber-reinforced precursor body is infiltrated with molten metal or silicon from the metal- or silicon-containing core.

6 Claims, 2 Drawing Sheets

PROCESS FOR PRODUCING BODIES MADE OF FIBER-REINFORCED COMPOSITES

BACKGROUND AND SUMMARY OF THE INVENTION

This application claims the priority of German Patent Application No. 198 34 571.2, filed Jul. 31, 1998, the disclosure of which is expressly incorporated by reference herein.

The present invention relates to a process for producing bodies made of fiber-reinforced composites from fiber-reinforced precursor bodies having a porous carbon matrix, in particular from C/C bodies. Fibers, fiber bundles or fiber agglomerates based on carbon, nitrogen, boron and/or silicon are mixed with at least one carbonizable binder, and if desired further additives or fillers, to give a pressing composition. The pressing composition is pressed to form a green body that is subsequently pyrolysed to convert the binder or binders into a porous carbon matrix. The resulting fiber-reinforced precursor body is infiltrated with molten metal or silicon.

The process of the present invention relates in particular to the production of ceramic composites and also to fiber-reinforced ceramic composites. A porous pre-ceramic body is infiltrated with a metal or silicon melt. In this infiltration, the liquid metal or silicon enters the pores. In the case of infiltration of pre-ceramic carbon bodies with silicon, the reaction to silicon carbide produces the actual ceramic. This process is described, for example, in DE 44 38 455 C1.

This type of process is used in the production of ceramic brake discs. However, the production of internally ventilated brake discs presents a problem. It is very difficult to introduce ventilation channels into solid, ceramic disc-like bodies since the material is very resistant and difficult to machine. Introduction of the channels into the pre-ceramic precursor body can lead to problems because the melt infiltration can sometimes alter the geometry of the workpiece and the dimensions.

It is therefore an object of the present invention to provide a process by means of which ceramic bodies having internal structures, in particular channels and the like, can be produced.

This object is achieved by providing a green body with at least one metal- or silicon-containing core that is used as metal or silicon source for the melt infiltration.

The process of the present invention in which the pre-ceramic bodies are melt-infiltrated using metal- or silicon-containing cores, with the cores serving as sources of metal or silicon, has the advantage that internally structured composites can be produced with high dimensional accuracy in a very simple manner.

In a variant of the present invention, the pre-ceramic body or green body is produced with internal structures into which the metal- or silicon-containing cores are inserted prior to melt infiltration. In a second embodiment, the internal structure, in particular the ventilation channels, are introduced in the form of metal- or silicon-containing cores during the pressing of the green body and remain in place until melt infiltration. Thus, it is possible to have (1) cores purely as the silicon source, or (2) cores which, for example in the manufacture of ventilated brake discs, function as pressing cores in the form of a tool insert to produce ventilation channels.

According to the present invention, preference is given to using cores of technical-grade metal or silicon. Another advantageous embodiment provides for a core comprising a mixture of silicon and boron nitride. In a third advantageous embodiment, alloys, in particular silicon-iron alloys or silicon-aluminium alloys, are used as the core.

The cores can be produced by casting or pressing. In addition, the cores can be produced under a protective gas. A protective gas is necessary when melting the silicon prior to the actual production of the core. Cores of high-purity to technical-grade silicon can be produced by casting. A preferred method of producing the cores is core shooting as is employed, for example, in the production of sand cores in foundry work. Silicon/boron nitride mixtures or alloys of silicon with other metals are castable and the melting point depression compared with the pure components, which is advantageous. They can also be produced by extrusion or pressure casting.

The channels to be filled with the cores can also be introduced by milling after the pressing of the green body.

In a further advantageous embodiment, a green body containing metal- or silicon-containing cores is pressed in a press with a floating die from a pressing composition containing one or more cores. During this procedure, the fibers in the pressing composition are oriented along the metal- or silicon-containing core in the direction of force. The resulting ceramic body has the typical properties of a ceramic, namely stiffness and a high abrasion resistance. These properties are particularly well-suited to brake discs.

Other objects, advantages and novel features of the present invention will become apparent from the following detailed description of the invention when considered in conjunction with the accompanying drawings.

DETAILED DESCRIPTION OF THE DRAWINGS

Figure 1A:
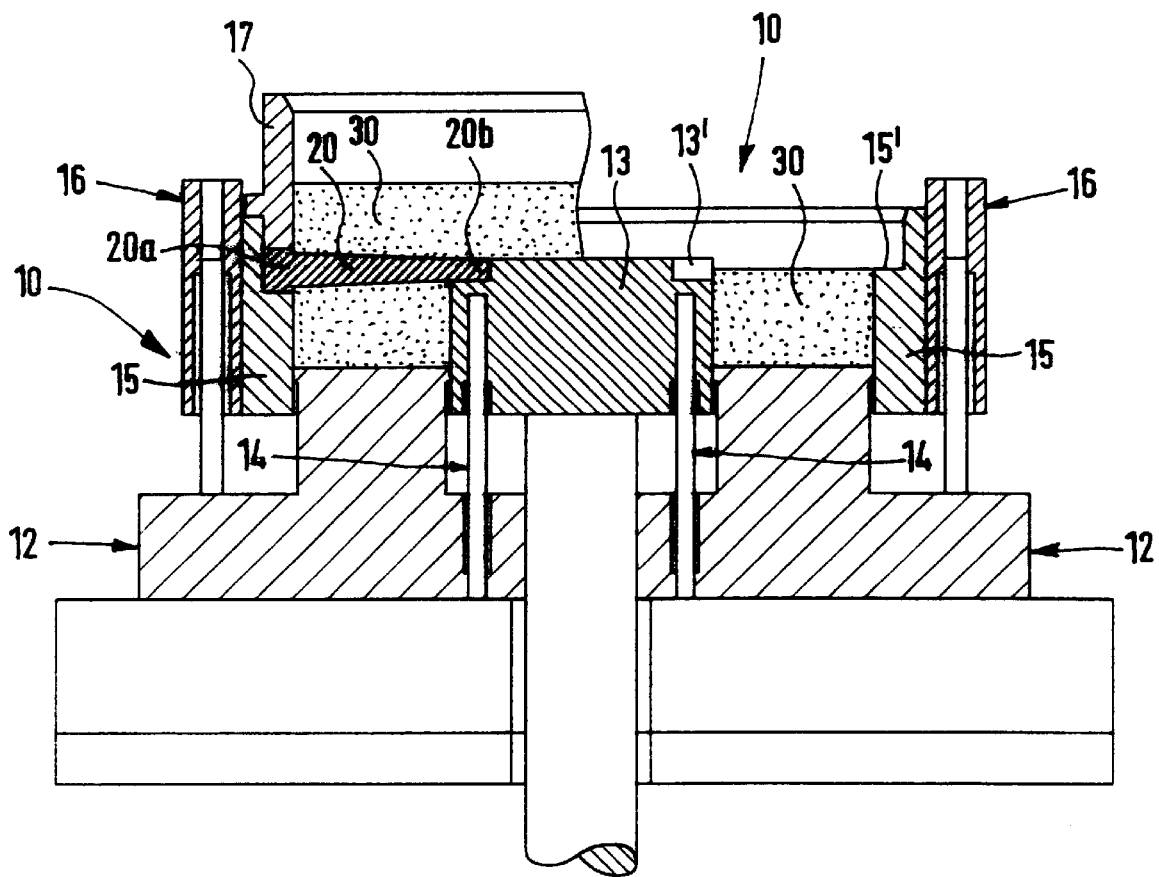
FIG. 1a shows a schematic cross section through a tool for pressing a pre-ceramic shaped body before (right) and after (left) insertion of a silicon-containing core.

To produce a pre-ceramic shaped body from a pressing composition, it is possible to use a conventional pressing tool. The pressing composition contains fibers or fiber bundles of silicon-, carbon-, boron- and/or nitrogen-containing fibers together with a binder suitable for pyrolysis, and optionally further binders and fillers. The fibers or fiber bundles can be impregnated with a binder suitable for pyrolysis and/or coated with pyrolytic carbon. This composition is pressed to produce a green body. The green body is subsequently carbonized (i.e., pyrolysed) under vacuum or protective gas to produce a carbon-containing porous shaped body which is infiltrated with a silicon melt.

The pressing tool used can have cores which are fixed to the inner surface of the pressing tool. The cores can, however, also be arranged in the pressing tool so as to be movable, e.g. hydraulically. The cores are inserted into the pressing composition. The cores can also be laid loose into the pressing tool. After pressing of the green body, the cores are drawn out to give a green body having holes running through it. Cores according to the present invention made of (1) high-purity or technical-grade silicon; (2) a mixture of silicon and boron nitride; or (3) an alloy of 60% silicon and 40% iron or 60% silicon and 40% aluminium are then inserted into these holes. The resulting green bodies provided with these cores are subsequently carbonized and silicized in a one-step process.

Cores of pure silicon can, for example, be cast by filling a boron nitride-coated mold with liquid silicon. After solidification, the finished cores can be taken out. Cores comprising a mixture of silicon and boron nitride can be produced, for example, by core shooting or isostatic pressing, if desired with addition of a binder. It is also possible to prepare a paste-like composition from silicon, boron nitride and one or more binders and to produce cores by means of extrusion in a manner comparable to the extrusion of plastics, which is known per se. Cores of an alloy can be produced, for example, from a metal powder having a binder content of from about 5 to 20% by weight by melting or pressing. It should be ensured that the silicon content of the cores is always sufficient for complete penetration of the pre-ceramic shaped body to be infiltrated.

The purity or the silicon content can be calculated for each individual case by a person skilled in the art, since the channel volume of the green body is known and the amount of silicon needed for melt infiltration can be calculated. The cores can be produced under protective gas and the melting of the silicon should take place under protective gas.

The green body provided with the inserted silicon cores is subsequently subjected to a known melt infiltration. Here, the silicon present in the cores melts and penetrates into the porous pre-ceramic shaped body, so that a reaction with the carbon present in the pre-ceramic shaped body takes place to form the ceramic material silicon carbide.

Figure 1B:
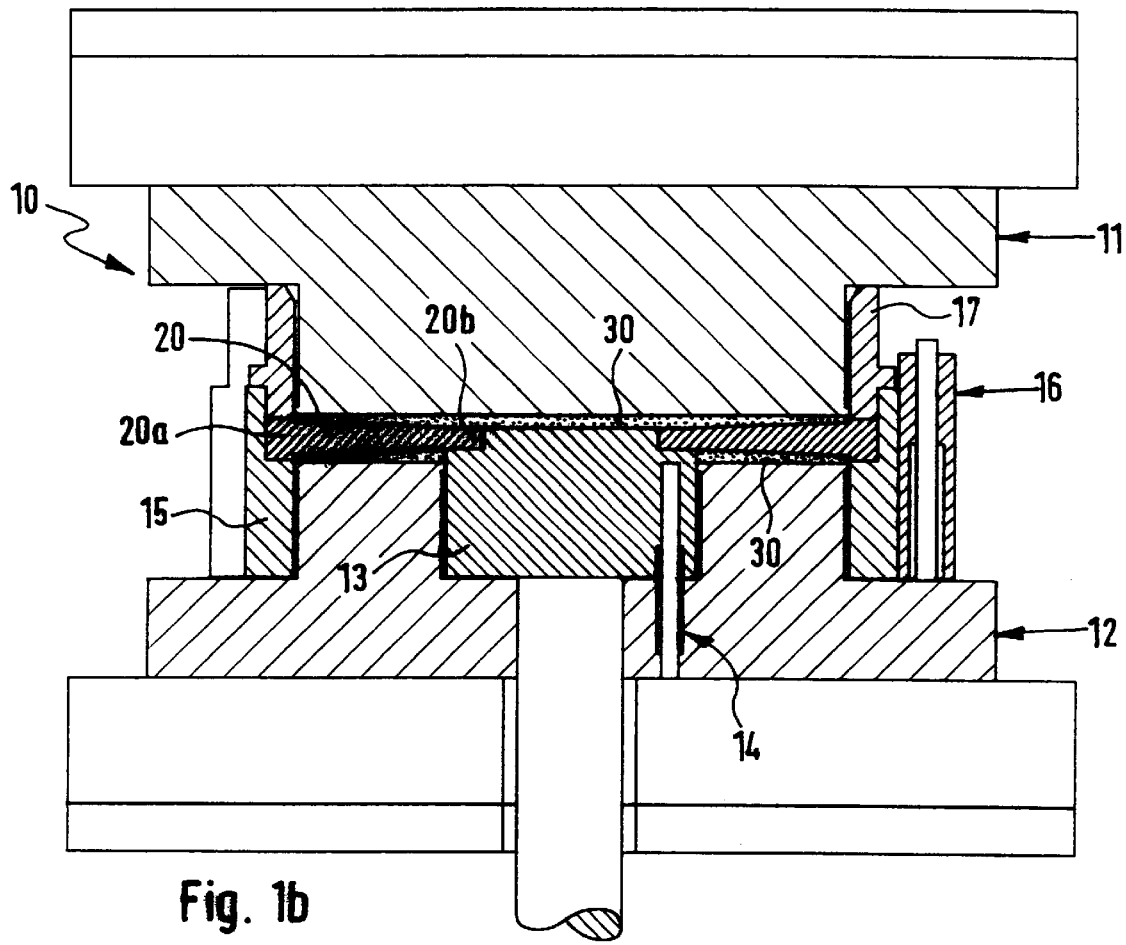
FIG. 1b shows the tool of FIG. 1a after the pressing step.

FIGS. 1a and 1b show a tool for pressing a pre-ceramic shaped body containing a silicon-containing core. The tool 10 has a top punch 11 (FIG. 1b) and a bottom punch 12. The bottom punch 12 additionally has an inner punch 13 which can be moved in a vertical direction by means of a hydraulic lifting device 14. The bottom punch 12 is also provided with a "floating die" 15 which can likewise be moved in a vertical direction by means of a hydraulic lifting device 16.

The space between the inner wall of the floating die 15 and the wall of the inner punch 13 is filled with the pressing composition 30 (FIG. 1a, right-hand side). Subsequently, a star-shaped core 20 of silicon or silicon/boron nitride or a silicon-containing alloy is laid into the tool 10. This star-shaped core 20 can be produced as described above. The core is laid in the tool in such a way that its outer edge 20a rests on the inside of the floating die 15 and its inner edge 20b rests on the inner punch 13. In the process, the inner punch 13 and the floating die 15 sink downwards a little along their lifting devices 14 and 16 respectively (FIG. 1a, left-hand side). Both the floating die 15 and the inner punch 13 can be provided with recesses 15' and 13', respectively, for the core 20. Subsequently, an annular insert 17 is placed on the floating die 15 and the outer edge 20a of the core 20 (FIG. 1a, left-hand side). The ring is filled with further pressing composition 30. Subsequently, the upper punch 11 is lowered and the pressing composition 30 is pressed to form a green body, with the floating die 15 and the inner punch 13 being moved fully downwards in a vertical direction (FIG. 1b).

Figure 2:
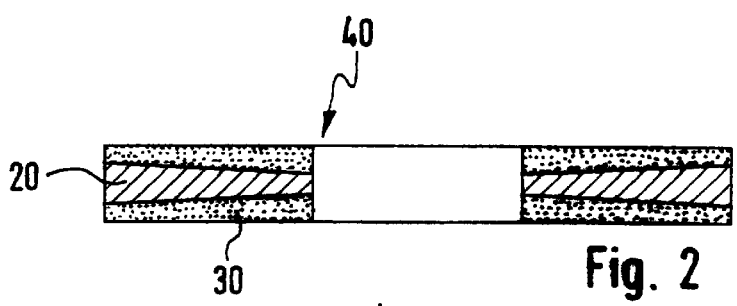
FIG. 2 shows a schematic cross section through a pre-ceramic shaped body obtainable using the tool of FIGS. 1a and 1b.

The finished pre-ceramic shaped body 40 containing the star-shaped core 20 is shown schematically in FIG. 2. It is subsequently subjected to pyrolysis and melt infiltration in a known manner. During this procedure, the star-shaped core 20 melts and the silicon penetrates into the pores of the pre-ceramic shaped body 40 and forms silicon carbide. This results in a ceramic body having holes whose position corresponds with high dimensional accuracy to that of the star-shaped core.

Figure 3:
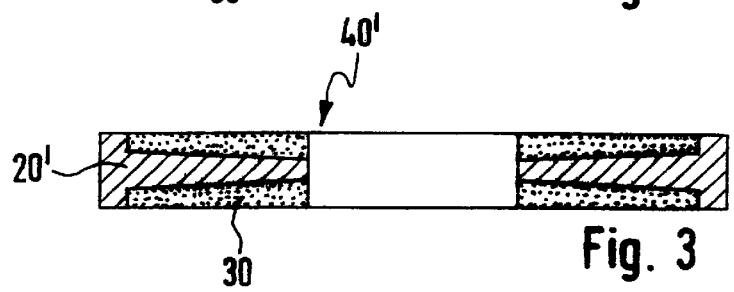
FIG. 3 shows a further embodiment of a pre-ceramic shaped body containing a silicon-containing core.

FIG. 3 shows a shaped body 40' with a variant 20' of the star-shaped core of FIG. 2 which in this case extends around the edges of the pressed shaped body 40. This variant is advantageous since the star-shaped core 20, 20' is relatively brittle. In the embodiment shown in FIG. 3, the star-shaped core 20' cannot move within the pre-ceramic shaped body 40' and thus reliably remains intact during the entire production process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing bodies made of fiber-reinforced composites, comprising:

mixing fibers, fiber bundles or fiber agglomerates based on carbon, nitrogen, boron, silicon and combinations thereof with at least one binder to form a pressing composition;

introducing at least one silicon-containing core into the pressing composition;

pressing the pressing composition to form a green body;

pyrolyzing the green body to convert the at least one binder into a porous carbon matrix, thereby obtaining a fiber-reinforced precursor body; and melting the at least one silicon-containing core, thereby infiltrating the fiber-reinforced precursor body with molten silicon.

2. A process according to claim 1, wherein the at least one silicon-containing core comprises a star-shaped core.

3. A process according to claim 1, wherein the at least one silicon-containing core comprises pure silicon.

4. A process according to claim 1, wherein the at least one silicon-containing core comprises an iron-silicon alloy or an aluminium-silicon alloy.

5. A process according to claim 1, wherein the at least one silicon-containing core comprises a mixture of boron nitride and silicon.

6. A process according to claim 1, wherein said pressing is by a pressing tool having a floating die.

* * * * *